(No Model.)

B. F. ENNIS.
TENSION FOR GRAIN BINDERS.

No. 248,091. Patented Oct. 11, 1881.

Attests
Wesley Williams
L. J. Mator

Inventor
Benjamin F. Ennis
By his atty.

UNITED STATES PATENT OFFICE.

BENJAMIN F. ENNIS, OF BROCKPORT, NEW YORK.

TENSION FOR GRAIN-BINDERS.

SPECIFICATION forming part of Letters Patent No. 248,091, dated October 11, 1881.

Application filed July 9, 1881. (No model.)

*To all whom it may concern:*

Be it known that I, BENJAMIN F. ENNIS, of the city of Brockport, in the county of Monroe and State of New York, have invented an Improvement in Tension Devices for Grain-Binders, of which the following is a specification.

My invention relates to tension devices for grain-binders; and it consists in a pivoted lever adapted to oscillate upon a fulcrum at one end, the other end of said lever being pressed against a flat bearing by a tension spring, the cord being drawn between the lever and flat bearing-surface, and in means to regulate the power of the tension-spring, all of which is more fully set forth in the following specification, and shown in the accompanying drawings, which form part thereof.

The object of my invention is to provide means to put the cord under any desired tension as it is fed to the binder-arm to bind the bundle.

Figure 1:
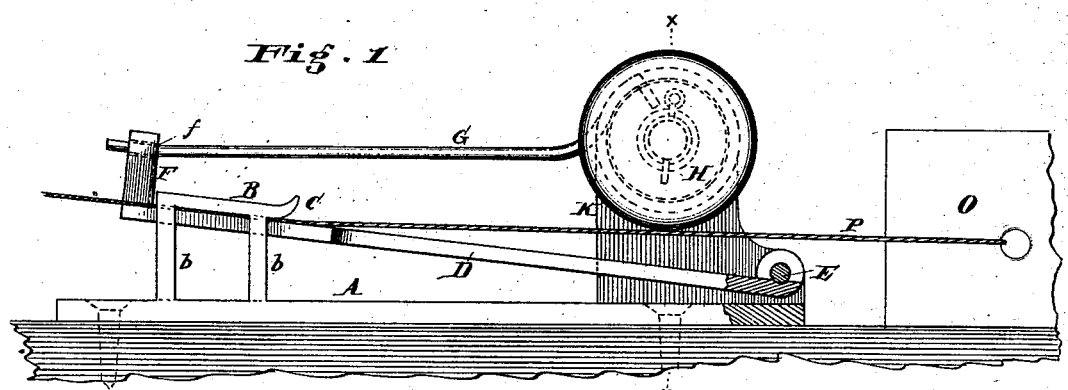
Figure 2:
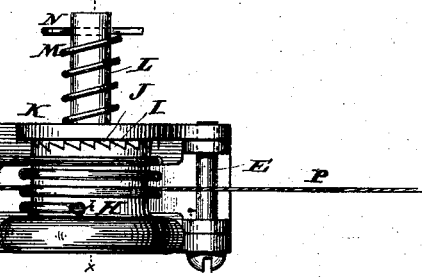
Figure 3:
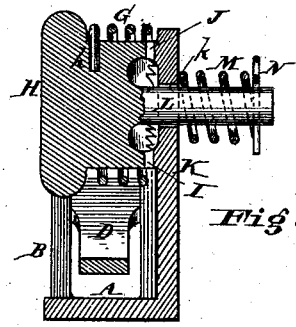

In the drawings, Figure 1 is a side elevation of my improved cord-tension device. Fig. 2 is a plan of same. Fig. 3 is a cross-section of same on line x x.

The plate A is provided with a flat bearing-surface or table, B, set on a radial line from the fulcrum E, and having its edge turned up, as at C, to prevent the cord catching. The lever D is flat, is pivoted at E to the plate A, and has its end free to vibrate between the legs b, which support the bearing-surface B. The bearing-surface B and lever D are in contact for some distance, as shown, to afford sufficient friction to the cord P, which is drawn from a ball in box O and passed between said plate or surface B and lever D, as shown in Figs. 1 and 2.

The end of the lever D is provided with a lug, F, which is furnished with a hole, f, through which the end of the tension-spring G is passed.

Forming part of plate A is a standard, K, which is provided with a hole, k, and ratchet-teeth J, located about said hole. A handle or knob, H, provided with teeth I, meshes with the teeth on the standard K, and is kept against them by a spring, M, which acts upon a pin, N, secured in the stem L, forming part of the handle H and passing through the hole k. The tension-spring G is coiled about the handle H, and the end is secured to said handle by being placed in a hole, h.

By turning the handle the power of the spring G may be increased or diminished, and the handle may be kept in any position by the ratchet-teeth.

Having now described my invention, what I claim as new, and desire to secure by Letters Patent, is—

In a tension device for grain-binders, the plate A, carrying the long flat bearing-surface B, having its edge curved at C, in combination with the lever D, pivoted at E, handle H, provided with ratchet-teeth I and stem L, tension-spring G, standard K, provided with ratchet-teeth J, and spring M, substantially as and for the purpose specified.

In testimony of which invention I hereunto set my hand.

BENJAMIN F. ENNIS.

Witnesses:
BYRON C. KETCHAM,
MORTON MINOT.